(12) United States Patent
Sakai et al.

(10) Patent No.: US 8,814,369 B2
(45) Date of Patent: Aug. 26, 2014

(54) OPTICAL MEMBER WITH PLATE-CRYSTAL FILM, METHOD FOR PRODUCING SAME, AND OPTICAL SYSTEM

(75) Inventors: Akira Sakai, Kawasaki (JP); Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 13/214,614

(22) Filed: Aug. 22, 2011

(65) Prior Publication Data

US 2012/0050871 A1 Mar. 1, 2012

(30) Foreign Application Priority Data

Aug. 31, 2010 (JP) ................................. 2010-193214

(51) Int. Cl.
*G02B 27/00* (2006.01)
(52) U.S. Cl.
USPC .......................................... 359/601; 359/900
(58) Field of Classification Search
USPC .......................................... 359/601, 613, 614
See application file for complete search history.

(56) References Cited

U.S. PATENT DOCUMENTS

| | | | | |
|---|---|---|---|---|
| 4,886,342 A * | 12/1989 | Kudo et al. | .................... | 359/738 |
| 6,552,859 B1 * | 4/2003 | Matsumoto et al. | ........... | 359/738 |
| 7,158,318 B2 * | 1/2007 | Shirie | ............................ | 359/738 |
| 7,749,682 B2 * | 7/2010 | Miyabe et al. | ............. | 430/270.1 |
| 2004/0120046 A1 * | 6/2004 | Shirie | ............................ | 359/611 |
| 2005/0064205 A1 * | 3/2005 | Sawada et al. | ................ | 428/432 |
| 2005/0123238 A1 * | 6/2005 | Ito | .................................... | 385/33 |
| 2005/0128600 A1 | 6/2005 | Suzuki | | |
| 2005/0233113 A1 * | 10/2005 | Kotani et al. | ................. | 428/141 |
| 2007/0057230 A1 | 3/2007 | Suzuki | | |
| 2008/0176038 A1 * | 7/2008 | Zhang et al. | .................. | 428/141 |
| 2008/0186592 A1 * | 8/2008 | Sakaki | .......................... | 359/707 |
| 2008/0305254 A1 * | 12/2008 | Tanaka et al. | ................ | 427/162 |
| 2010/0110569 A1 * | 5/2010 | Lin et al. | ...................... | 359/819 |
| 2011/0279913 A1 * | 11/2011 | Watanabe | ...................... | 359/728 |
| 2012/0012791 A1 * | 1/2012 | Bonneau | .................. | 252/301.36 |
| 2012/0207973 A1 * | 8/2012 | Sakai et al. | .................... | 428/141 |
| 2012/0212827 A1 * | 8/2012 | Kakegawa | ..................... | 359/601 |
| 2012/0218639 A1 * | 8/2012 | Minoura et al. | ............. | 359/601 |
| 2012/0262794 A1 * | 10/2012 | Uchida et al. | ................ | 359/601 |
| 2012/0314294 A1 * | 12/2012 | Nakayama | ..................... | 359/580 |
| 2013/0027779 A1 * | 1/2013 | Okuno et al. | ................. | 359/586 |

FOREIGN PATENT DOCUMENTS

| | | |
|---|---|---|
| CN | 1627103 A | 6/2005 |
| CN | 1834693 A | 9/2006 |
| EP | 1693689 A1 | 8/2006 |
| JP | 58-004946 | 1/1983 |
| JP | 9-202649 | 8/1997 |
| JP | 2005-275372 | 10/2005 |
| JP | 2006-259711 | 9/2006 |
| WO | 2008/149631 A1 | 12/2008 |

* cited by examiner

*Primary Examiner* — Arnel C Lavarias
(74) *Attorney, Agent, or Firm* — Canon U.S.A., Inc., IP Division

(57) ABSTRACT

An optical member includes a ray effective area, a ray ineffective area, at least one continuous protective film arranged over the ray effective area and at least part of the ray ineffective area, a light-shielding film arranged on the protective film located in the ray ineffective area, and a plate-crystal film arranged on the protective film located in the ray effective area, the plate-crystal film including mainly aluminum oxide and having a textured structure on a surface thereof, and an optical system includes the optical member.

12 Claims, 5 Drawing Sheets

(1) FORMATION OF PROTECTIVE FILM BY COATING (2) FORMATION OF ALUMINUM OXIDE FILM BY COATING (3) FORMATION OF LIGHT-SHIELDING FILM BY COATING (4) HOT-WATER TREATMENT (5) RESULTING OPTICAL MEMBER

OPTICAL MEMBER WITH PLATE-CRYSTAL FILM, METHOD FOR PRODUCING SAME, AND OPTICAL SYSTEM

BACKGROUND OF THE INVENTION

1. Field of the Invention

The present invention relates to an optical member configured to provide antireflective performance, an optical system including the optical member, and a method for producing an optical member. In particular, the present invention relates to an optical member configured to stably provide high antireflective performance from the visible region to the near-infrared region over a prolonged period of time and an optical system including the optical member.

2. Description of the Related Art

Antireflective structures with periodic microstructures which have repetition periods each equal to or lower than a wavelength in the visible region and which have appropriate pitches and heights are known to provide excellent antireflection performance in a wide wavelength range. A known example of a method for forming a periodic microstructure is a method in which a film including fine particles dispersed therein is formed by coating, the fine particles each having a particle size equal to or lower than a wavelength in the visible region.

A microfabrication method for forming a periodic microstructure by patterning with micromachining equipment, e.g., an electron beam lithography system, a laser interference exposure apparatus, a semiconductor exposure apparatus, or an etching apparatus, enables us to control the pitch and height of the periodic microstructure. It is also known that the microfabrication method provides the formation of a periodic microstructure having excellent antireflection performance.

Japanese Patent Laid-Open No. 9-202649 discloses another method in which a textured structure composed of boehmite, which is aluminum hydroxide oxide, is grown on a base to provide an antireflection effect. In this case, an aluminum oxide film formed by vacuum deposition or a liquid-phase method (sol-gel method) is subjected to steam treatment or hot-water immersion treatment to modify its surface into a boehmite surface having a plate-crystal structure, thereby providing an antireflection coating.

Although such a method for forming a plate-crystal film by steam treatment or hot-water immersion treatment is simple, a base needs to be exposed to steam or hot water. So, if the base is composed of glass, some constituents may be leached during the immersion in hot water to preclude the growth of the plate-crystal structure or to be left in the textured structure, thereby reducing the antireflective performance.

Furthermore, even if glass, whose constituents are likely to be leached, is just allowed to stand for prolonged periods of time at high temperature and humidity, the constituents may be leached out to reduce the performance of the plate-crystal film. To prevent leaching of constituents from glass, a technique using a laminated film having a diffusion preventing function is disclosed. For example, Japanese Patent Laid-Open No. 2006-259711 discloses that an antireflection coating in which a film having an intermediate refractive index is arranged between a base and a plate-crystal film (boehmite film having a textured structure) provides relatively stable antireflective performance.

For optical members, such as lenses, various improvements are made in order to prevent the generation of harmful light that causes flare and ghosting and to provide high-quality, high-performance optical members. For example, the arrangement of a light-shielding film on a ray ineffective area of an optical member makes it possible to improve the absorptance of harmful light based on the optical design to reduce the reflectance. In this case, a method for forming a light-shielding film by coating on a ray ineffective area, such as a side end portion, of an optical member is employed.

Japanese Patent Laid-Open No. 58-004946 discloses a light-shielding film made of an inner-surface-reflection-preventing coating material that contains a vinylidene chloride-based copolymer of a vinyl ester or acrylonitrile, and either coal tar or coal-tar pitch. The light-shielding film has excellent antireflective performance at the end face of a lens.

As described above, while an antireflection coating is required to provide excellent antireflective performance, the related art has problems described below.

In the case where a protective film is formed in a ray effective area, a light-shielding film is located in a ray ineffective area of an optical member. This is liable to cause uneven thickness or nonuniform treatment in the ray ineffective area, thereby reducing the antireflection function of a plate-crystal film having a boehmite textured structure configured to prevent reflection in a ray effective area. As a result, a region of the ray effective area where reflection is prevented is reduced, thereby leading to poor appearance and an increase in the reflectance of the optical member.

A light-shielding film located in a ray ineffective area of an optical member can be delaminated to cause poor appearance in long-term use or a high-temperature and high-humidity environmental test.

Furthermore, after the long-term use or the environmental durability test, the leaching of a constituent from a base of an optical member can change the optical properties of a plate-crystal film arranged to prevent reflection.

The present invention has been accomplished in light of the circumstances described above. Aspects of the present invention provide an optical member having stable antireflective performance for prolonged periods of time, an optical system including the optical member, and a method for producing an optical member.

SUMMARY OF THE INVENTION

According to an aspect of the invention, an optical member to overcome the foregoing problems includes a ray effective area, a ray ineffective area, at least one continuous protective film over the ray effective area and at least part of the ray ineffective area, a light-shielding film arranged on the protective film located in the ray ineffective area, and a plate-crystal film arranged on the protective film located in the ray effective area, the plate-crystal film including mainly aluminum oxide and having a textured structure on a surface thereof.

According to an aspect of the invention, a method for producing an optical member to overcome the foregoing problems includes the steps of forming at least one continuous protective film over the ray effective area and at least part of the ray ineffective area, forming a light-shielding film on the protective film located in the ray ineffective area, forming an aluminum-containing film on the protective film located in the ray effective area, and bringing the aluminum-containing film into contact with hot water to form a plate-crystal film on the protective film located in the ray effective area, the plate-crystal film having a textured structure on a surface thereof and including mainly aluminum oxide.

According to an aspect of the invention, a method for producing an optical member to overcome the foregoing problems includes the steps of forming at least one continuous protective film over the ray effective area and at least part of the ray ineffective area, forming an aluminum-containing film on the protective film, forming a light-shielding film on the aluminum-containing film located in the ray ineffective area, and bringing the aluminum-containing film located in the ray effective area into contact with hot water to form a plate-crystal film on the protective film located in the ray effective area, the plate-crystal film having a textured structure on a surface thereof and including mainly aluminum oxide.

According to an aspect of the invention, an optical system to overcome the foregoing problems includes the optical member described above.

Aspects of the present invention provide an optical member configured to stably provide antireflective performance over a prolonged period of time, an optical system including the optical member, and a method for producing an optical member.

In particular, aspects of the present invention provide the optical member having an extended ray effective area with an antireflection function and having excellent optical properties, and provide a method for producing the optical member.

The optical member according to aspects of the present invention has more stable optical properties and prevents poor appearance occurring in the light-shielding film even in long-term use or a high-temperature and high-humidity environment after a high-temperature process. Furthermore, the optical member according to aspects of the present invention prevents the leaching of constituents from a glass base to provide stable antireflective performance.

Further features of the present invention will become apparent from the following description of exemplary embodiments with reference to the attached drawings.

DESCRIPTION OF THE EMBODIMENTS

Embodiments of the present invention will be described in detail below.

An optical member according to aspects of the present invention includes a ray effective area, a ray ineffective area, at least one continuous protective film arranged over the ray effective area and at least part of the ray ineffective area, a light-shielding film arranged on the protective film located in the ray ineffective area, and a plate-crystal film arranged on the protective film located in the ray effective area, the plate-crystal film being mainly composed of aluminum oxide and having a textured structure on a surface thereof.

Figure 1A:
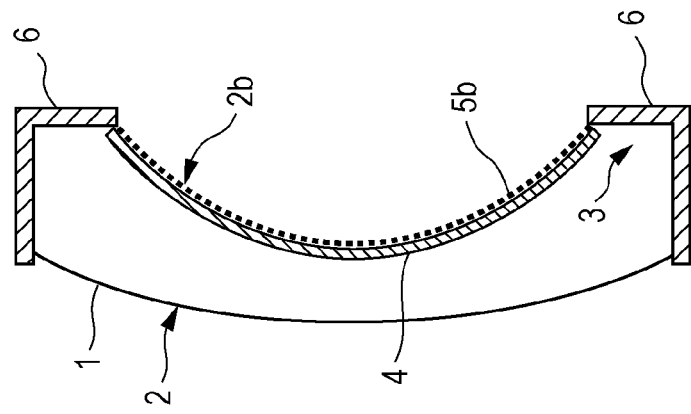
FIG. 1A is a schematic view of an optical member according to an embodiment of the present invention.

FIG. 1A is a schematic view of an optical member according to an embodiment of the present invention. In FIG. 1A, the optical member according to an embodiment of the present invention includes a ray effective areas 2 and 2b and a ray ineffective area 3. A base 1 is a concave meniscus lens. A continuous protective film 4 is laminated on the entire surface of the ray effective area 2b, which is one of the ray effective areas, and at least part of the ray ineffective area 3.

A light-shielding film 6 is arranged on the protective film 4 located in the ray ineffective area 3. That is, the protective film 4 is laminated between the light-shielding film 6 and the base 1. A plate-crystal film 5b (indicated by a broken line in FIG. 1A) which is mainly composed of aluminum oxide and which has a textured structure on a surface thereof is arranged on the protective film 4 located in the ray effective area 2b. The protective film 4 can be arranged so as to cover the entire base 1 including its end portion.

Figure 1B:
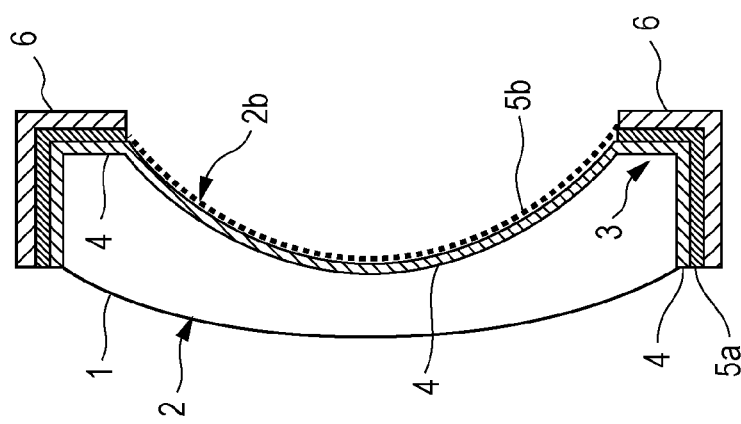
FIG. 1B is a schematic view of an optical member according to another embodiment of the present invention.
Figure 1C:
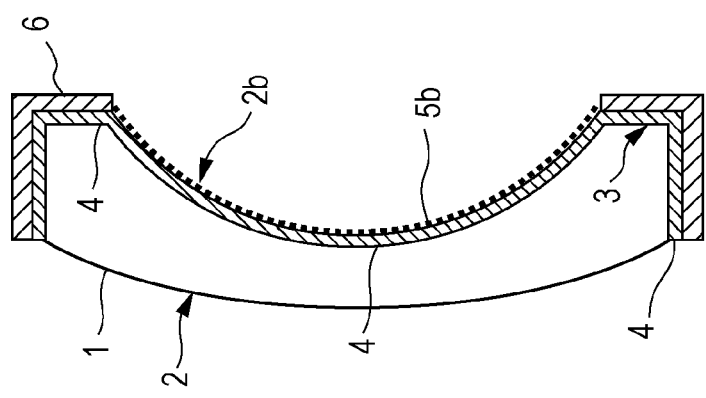
FIG. 1C is a schematic view of an optical member according to the related art.

FIG. 1B is a schematic view of an optical member according to another embodiment of the present invention. In FIG. 1B, the plate-crystal film 5b is located in the ray effective area 2b. An aluminum-containing film 5a is arranged between the protective film 4 and the light-shielding film 6 located in the ray ineffective area 3. Other components are the same as those of the optical member illustrated in FIG. 1A.

The term "ray effective area" indicates a region through which a light ray is effectively passed. The term "ray ineffective area" indicates a region other than the ray effective area.

The optical member according to aspects of the present invention has the foregoing structure and thus provides advantages described below.

(1) The uniformity of the protective film is improved. The continuous protective film 4 is uniformly formed in the ray effective area 2b and at least part of the ray ineffective area 3 of the base 1 before the formation of the light-shielding film 6 (opaque film). This improves nonuniformity in the thickness of the protective film 4 and expands a low-reflection region of the ray effective area.

(2) The adhesion of the light-shielding film is improved. The arrangement of the protective film 4 between the light-shielding film 6 and the base 1 improves the adhesion between the light-shielding film 6 and the base 1 in the ray ineffective area 3.

(3) The leaching of constituents from the base 1 to the plate-crystal film 5b having a textured structure of boehmite may affect the optical properties. Possible pathways of the leaching of constituents include one pathway in which leaching occurs at the interface between the base 1 and the plate-crystal film 5b having a textured structure of boehmite in the ray effective area 2b; and another pathway in which the constituents are leached from the base 1 in the ray ineffective area 3 to the plate-crystal film 5b having a textured structure of boehmite through the light-shielding film 6. Covering the base 1 with the protective film 4 blocks the pathways of leaching of the constituents of the base to prevent leaching to the plate-crystal film, thereby resulting in an optical member having high environmental stability.

Base

Examples of the base used in the optical member according to aspects of the present invention include glass bases, plastic bases, glass mirror bases, and plastic mirror bases.

Typical examples of the plastic bases include films and formed articles composed of thermoplastic resins, such as polyester, triacetyl cellulose, cellulose acetate, polyethylene terephthalate, polypropylene, polystyrene, polycarbonate, polymethyl methacrylate, ABS resins, polyphenylene oxide, polyurethane, and polyvinyl chloride; and crosslinked films and crosslinked formed articles composed of unsaturated polyester resins, phenolic resins, crosslinked polyurethane, crosslinked acrylic resins, and crosslinked saturated polyester resins.

Specific examples of glass include alkali glass, alkali-free glass, aluminosilicate glass, borosilicate glass, barium-based glass, and lanthanum-based glass.

While the concave meniscus lens is used as the base 1 as described above, aspects of the present invention are not limited thereto. Examples of the base 1 include biconvex lenses, biconcave lenses, planoconvex lenses, planoconcave lenses, convex meniscus lenses, aspherical lenses, free-form-surface lenses, and optical components each having a prism shape.

Light-Shielding Film

The light-shielding film 6 according to aspects of the present invention is opaque at an operating wavelength. A black dye, another color dye or pigment, fine opaque particles, a resin, or a mixture of various color dyes, pigments, fine particles, and other components is used for the light-shielding film 6.

The thickness of the light-shielding film 6 may be appropriately selected in view of optical properties, mechanical properties, and so forth and is in the range of 0.1 µm to 100 µm and preferably 1 µm to 50 µm.

Plate-Crystal Film Mainly Composed of Aluminum Oxide and Having Textured Structure on Surface Thereof The plate-crystal film 5b according to aspects of the present invention has an antireflection function and is used as an antireflection coating.

A surface of the plate-crystal film 5b has irregularities. An aluminum-containing film (also referred to as an "aluminum film") is immersed in hot water to subject a surface layer of the film to, for example, peptization, followed by deposition on the surface layer and growth to form plate crystals.

In the case where the aluminum film is formed by a sol-gel method, an Al compound alone or an Al compound together with at least one compound selected from Zr, Si, Ti, Zn, and Mg compounds may be used as a raw material for a precursor sol.

Examples of a raw material that can be used for the compounds, such as $Al_2O_3$, $ZrO_2$, $SiO_2$, $TiO_2$, ZnO, and MgO include metal alkoxides; and salt compounds, such as chlorides and nitrides. In particular, as raw materials for $ZrO_2$, $SiO_2$, and $TiO_2$, metal alkoxides can be used from the viewpoint of achieving good film formability.

The aluminum-containing film may be a film mainly composed of aluminum oxide prepared by, for example, the sol-gel method. Alternatively, the aluminum-containing film may be a film composed of metallic Al alone or a film containing metallic Al and a metal, e.g., metallic Zn or metallic Mg, by a known gas-phase method, for example, chemical vapor deposition (CVD) or physical vapor deposition (PVD), e.g., evaporation or sputtering.

The aluminum-containing film is brought into contact with hot water to cause dissolution of or deposition on the surface of the film, thereby forming a textured structure composed of plate crystals mainly composed of aluminum oxide.

The plate crystals mainly composed of aluminum oxide are crystals mainly composed of aluminum oxide, aluminum hydroxide, or hydrated aluminum oxide. In particular, boehmite can be used as the plate crystals.

Examples of a method that can be employed for forming a textured structure of plate crystals mainly composed of aluminum oxide include methods described in, for example, Japanese Patent Laid-Open Nos. 2006-259711 and 2005-275372.

The term "plate-crystal film" used in the specification indicates a film having a textured structure of plate crystals mainly composed of aluminum oxide, the film being formed by bringing the aluminum-containing film into contact with hot water to cause dissolution of or deposition on the surface of the film.

Protective Film

The continuous protective film 4 according to aspects of the present invention is laminated over the ray effective area 2b and at least part of the ray ineffective area 3 of the base 1 so as to be in close contact with the base 1, the protective film 4 having a single- or multiple-layer structure or being a surface-treated film. The protective film 4 is arranged between the base and the plate-crystal film.

The protective film 4 according to aspects of the present invention has the function of improving the adhesion between the light-shielding film 6 and the base 1 in the ray ineffective area. Furthermore, the protective film 4 according to aspects of the present invention is subjected to a high-temperature process, preventing delamination at the interface caused by use for prolonged periods of time or a high-temperature and high-humidity environmental test.

The protective film has a thickness of about 1 nm to about 200 nm and preferably 5 nm to 100 nm.

The protective film can have the function of adjusting a refractive index so as to minimize the reflectance of the ray effective area by appropriately adjusting the refractive index and the thickness of the protective film in the ray effective area 2b with respect to refractive indices of the plate-crystal film 5b and the base 1.

Specifically, controlling proportions of constituents of the protective film 4 suppresses the transfer of constituents, such as an alkali, of the base from the base to the plate-crystal film mainly composed of aluminum oxide. Furthermore, the film can be selected in such a manner that the relationship between the refractive index $n_s$ of the protective film and the refractive index $n_b$ of the base is $n_b \geq n_s$.

As a result, the refractive index is continuously reduced with increasing distance from the base toward the interface between air and the plate-crystal film. This combines with the effect of the refractive indices of the protective film and the plate-crystal film composed of plate crystals mainly containing aluminum oxide to provide high antireflective performance.

As a protective film that satisfies all these effects, a thin film containing at least Si can be used. In particular, a $SiO_x$ (x=1 to 2) film or a SiTi film can be used.

The Si-containing film serving as a protective film according to aspects of the present invention can be composed of an amorphous oxide film mainly composed of $SiO_2$. Other oxides, such as $TiO_2$ and $ZrO_2$, may be contained separately or in combination. The protective film has a $SiO_2$ content of 10 mol % to 100 mol % and preferably 15 mol % to 100 mol %.

As the protective film 4 according to aspects of the present invention, a protective film containing an organic constituent may be used.

Examples of the organic constituent include organic polymers, such as acrylic resins, epoxy resins, oxetane resins, maleimide resins, melamine resin, benzoguanamine resins, phenolic resins, resol resins, polycarbonate, polyester, polyarylate, polyether, polyurea, polyurethane, polyamide, polyamide-imide, polyimide, polyketone, polysulfone, polyphenylene, polyxylylene, polycycloolefins, and polyorganosilsesquioxane.

The protective film according to aspects of the present invention may be formed by a known gas-phase method, such as CVD or PVD, e.g., evaporation or sputtering, or a liquid-phase method, such as a sol-gel method or liquid application.

Examples of a method for forming a protective film using a sol-gel coating solution include known application methods, such as dipping, spin coating, spraying, printing, flow coating, and combination thereof.

The thickness may be controlled by changing a withdrawal rate for dipping, the spin rate of a base for spin coating, and the concentration of a coating solution.

The withdrawal rate for dipping may be appropriately selected in response to a target thickness. After immersion, a base can be withdrawn at a uniform withdrawal rate of, for example, about 0.1 to about 3.0 mm/sec.

After the application, drying may be performed at room temperature for about 30 minutes. Furthermore, drying or heat treatment may be performed at a higher temperature, as needed. A higher heat-treatment temperature is likely to form a higher-density film.

The Si-containing protective film according to aspects of the present invention may be formed by a vapor deposition method, for example, sputtering, evaporation, or CVD.

The continuous protective film according to aspects of the present invention is formed over the ray effective area and the ray ineffective area. To achieve uniform film formation along the surface profile of the base, the surface diffusion of a precursor can be promoted during the growth process. To this end, the promotion of diffusion by a base surface temperature, the passivation treatment of the surfaces, and the energy control of the precursor are effective in forming a uniform film.

Temperature of Base

In evaporation, sputtering, and CVD, an increase in the temperature of the base allows the surface diffusion of the precursor to be promoted. The temperature can be appropriately set to a temperature below the re-evaporation temperature. The base temperature can involve the relaxation of the film structure. The base temperature may be appropriately set in view of the heat resistance of the base.

In CVD, surface defects can be subjected to passivation by, for example, introducing oxygen gas, thereby promoting surface diffusion to improve the uniformity. In evaporation and sputtering, reactive evaporation and reactive sputtering may be employed.

Among these methods, in ion plating, sputtering, and CVD, the application of a bias to the base makes it possible to control the kinetic energy of an ionized precursor that reaches the base. This control can also promote the surface diffusion of the ionized precursor.

An appropriate adjustment of the internal pressure of a film-forming space makes it possible to control a plasma state in a film-forming method and to control the kinetic energy of the ionized precursor. A combination of these parameters provides excellent surface diffusion, thus resulting in the formation of a uniform film.

In evaporation and sputtering, the kinetic energy of a precursor can be controlled by the energy assist effect of an ion beam from an ion source different from an evaporation source or a sputtering source, thereby promoting the diffusion of the precursor on the base surfaces to form a uniform film.

Regarding a method for forming a uniform film, in evaporation, an evaporation source can be fixedly located so as to face the base. Alternatively, the base may be attached to a rotary jig, and the rotary jig may be rotated in such a manner that rotational symmetry is obtained with respect to the direction of the axis of the evaporation. Furthermore, the base may be rotated to form a uniform film by evaporation.

Moreover, the base may be fixedly located, and a plurality of evaporation sources or sputtering sources may be arranged, thereby forming a uniform film.

Two methods for producing an optical member according to aspects of the present invention are described below.

Figure 3A:
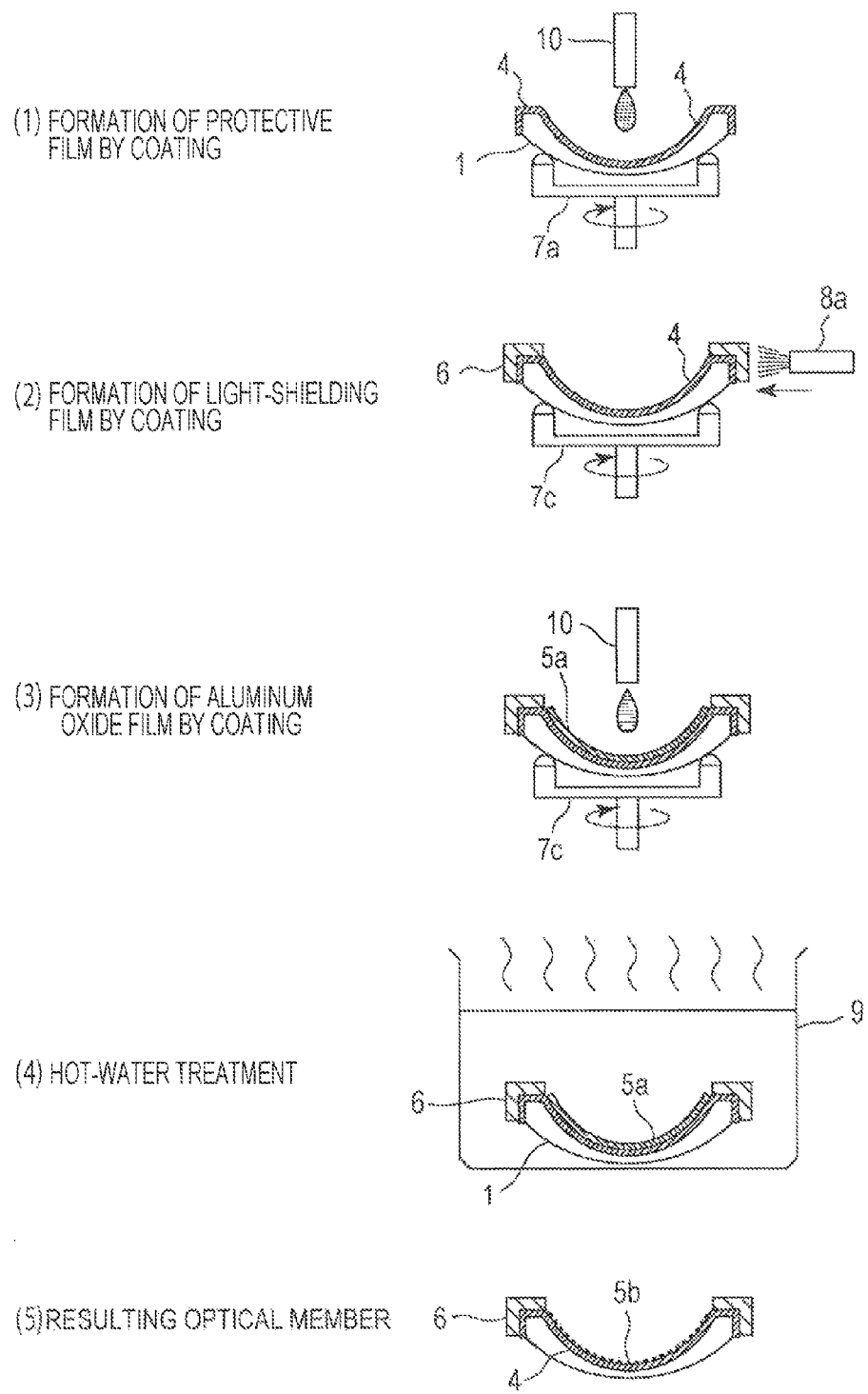
FIGS. 3A(1) to 3A(5) are process drawings illustrating a method for producing an optical member according to an embodiment of the present invention.

FIGS. 3A(1) to 3A(5) are schematic process drawings illustrating a method for producing a first optical member according to aspects of the present invention.

As illustrated in the drawings, the production method according to aspects of the present invention is a method for producing an optical member having a ray effective area and a ray ineffective area, the method including the step (1) of forming the at least one continuous protective film 4 over the ray effective area and at least part of the ray ineffective area; the step (2) of forming the light-shielding film 6 on the protective film located in the ray ineffective area; the step (3) of forming the aluminum-containing film 5a on the protective film located in the ray effective area; and the steps (4) and (5) of bringing the aluminum-containing film 5a into contact with hot water to form the plate-crystal film 5b on the protective film located in the ray effective area, the plate-crystal film 5b having a textured structure on a surface thereof and being mainly composed of aluminum oxide.

Figure 3B:
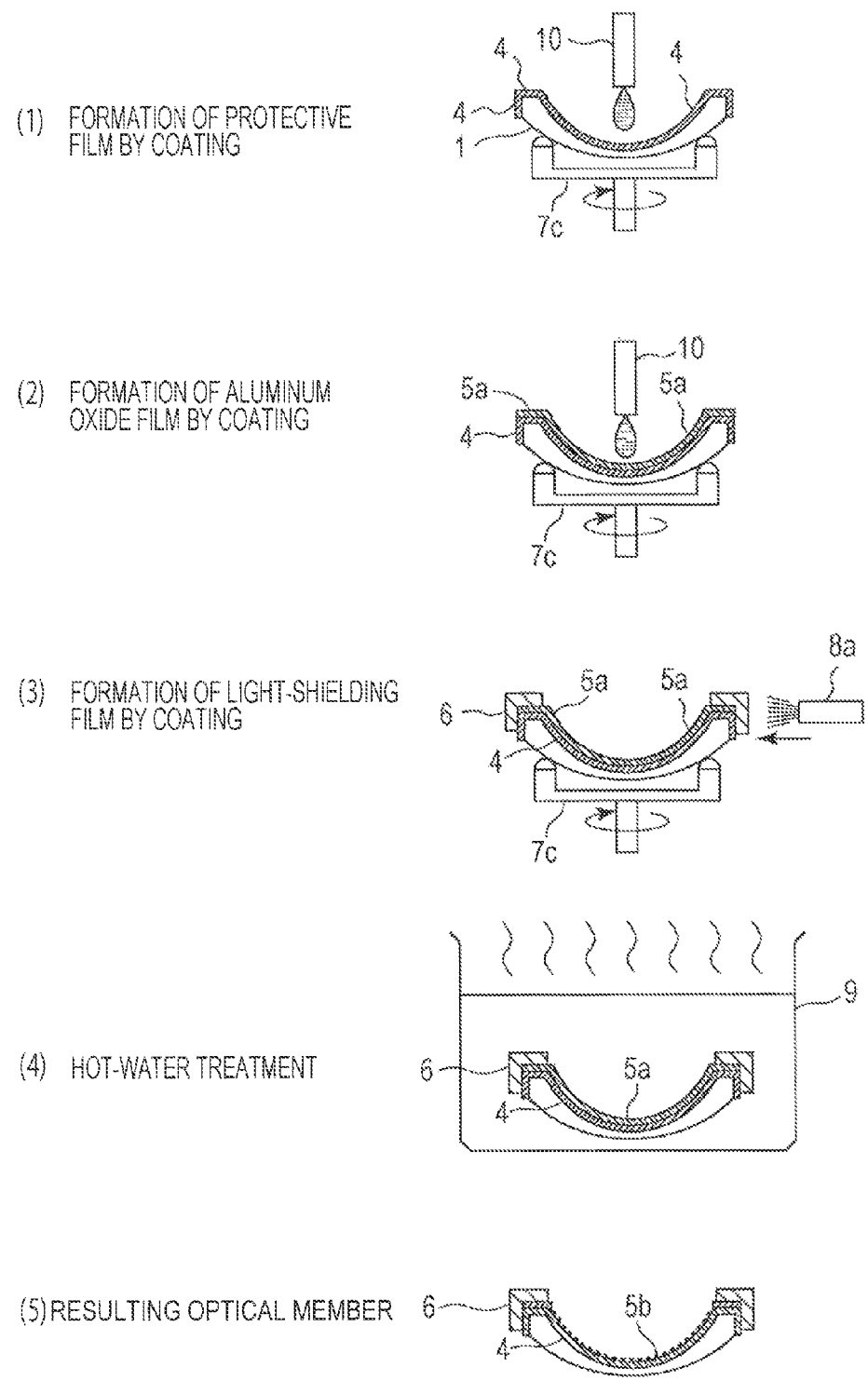
FIGS. 3B(1) to 3B(5) are process drawings illustrating a method for producing an optical member according to another embodiment of the present invention.

FIGS. 3B(1) to 3B(5) are schematic process drawings illustrating a method for producing a second optical member according to aspects of the present invention.

As illustrated in the drawings, the production method is a method for producing an optical member having a ray effective area and a ray ineffective area, the method including the step (1) of forming the at least one continuous protective film 4 over the ray effective area and at least part of the ray ineffective area; the step (2) of forming the aluminum-containing film 5a on the protective film; the step (3) of forming the light-shielding film 6 on the aluminum-containing film 5a located in the ray ineffective area; and the steps (4) and (5) of bringing the aluminum-containing film 5a located in the ray effective area into contact with hot water to form the plate-crystal film 5b on the protective film located in the ray effective area, the plate-crystal film 5b having a textured structure on its surface and being mainly composed of aluminum oxide.

An optical system according to aspects of the present invention includes the optical member described above.

Specific examples of the optical system according to aspects of the present invention include lens units for cameras.

Example 1

An optical member illustrated in FIG. 1A is produced by a method for producing an optical member illustrated in FIGS. 3A(1) to 3A (5).

(1) Formation of Protective SiTi Film by Coating

The base 1 composed of a lanthanum-based glass is rinsed with deionized water, washed with an alcohol, and placed on a rotary stage 7a fitted with a vacuum chuck as illustrated in FIG. 3A(1). An appropriate amount of a sol solution containing Si and Ti is dropped onto the base 1 with the base 1 rotated slowly. Spin coating is performed at about 3000 rpm for about 20 seconds.

The resulting film is baked at 80° C. or higher for 10 minutes in an oven to form a continuous protective amorphous SiTi film having a thickness of 50 nm over the ray effective area 2b and part of the ray ineffective area 3.

(2) Formation of Light-Shielding Film by Coating

A resin containing a black dye, an additive, and a curing agent is applied with a brush 8a onto the ray ineffective area 3 (outer end portion of the base 1) and dried to form a coating as a light-shielding film at an operating wavelength.

While the black dye is used in this example, aspects of the present invention are not limited thereto. Other color dyes or pigments, fine particles, or a mixture of various color dyes, pigments, fine particles, and other components may be used.

(3) Formation of Aluminum Oxide Film by Coating

The base 1 on which the light-shielding film is formed by coating is placed on a rotary stage 7c fitted with a vacuum chuck. An appropriate amount of an aluminum-containing coating solution is dropped from a dispenser 10 onto the ray effective area 2b. The base 1 is rotated at about 3000 rpm for about 30 seconds and baked at 100° C. or higher for 30 minutes or more in an oven.

Here, with respect to spin-coating conditions, the spin rate is set to about 3000 rpm, and the spin time is set to about 30 seconds. However, the conditions are not limited thereto. To achieve a target thickness, coating conditions may be changed. Furthermore, the coating method is not limited to spin coating. For example, dipping or spray coating may be employed.

(4) Hot-Water Treatment

The base 1 is immersed in a hot-water treatment container 9 illustrated in FIG. 3A(4) to form the plate-crystal film 5b in the ray effective area 2b. The base 1 is immersed in hot water having a temperature of 60° C. to 100° C. in the hot-water treatment container 9 for 5 minutes to 24 hours. Then the base 1 is withdrawn and dried.

(5) Optical Member

Figure 2A:
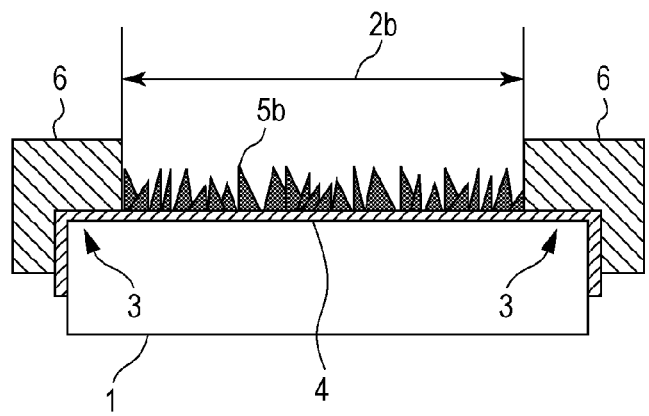
FIG. 2A is a schematic view of a ray effective area of an optical member according to an embodiment of the present invention.

Thereby, an optical member illustrated in FIG. 3A(5) is produced. As illustrated in FIG. 2A, the resulting optical member includes the plate-crystal film 5b on the protective film 4 located in the ray effective area 2b, the plate-crystal film 5b being composed of petaloid transparent alumina.

One of the resulting optical members is sampled. A surface of the ray effective area is observed from above and in cross section with a field-emission scanning electron microscope (FE-SEM). The observation results demonstrate the formation of a petaloid plate-crystal film having an average pitch of 400 nm or less and an average height of 50 nm or more.

Evaluation of Optical Member

Similarly, the observation of the cross section of the protective SiTi film in the vicinity of the ray ineffective area with the FE-SEM demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.

Leaching of Constituent

X-ray fluorescence analysis of the plate-crystal film in the ray effective area under the same high-temperature and high-humidity conditions reveals that a constituent element of glass is not detected.

Comparative Example 1

Figure 3C:
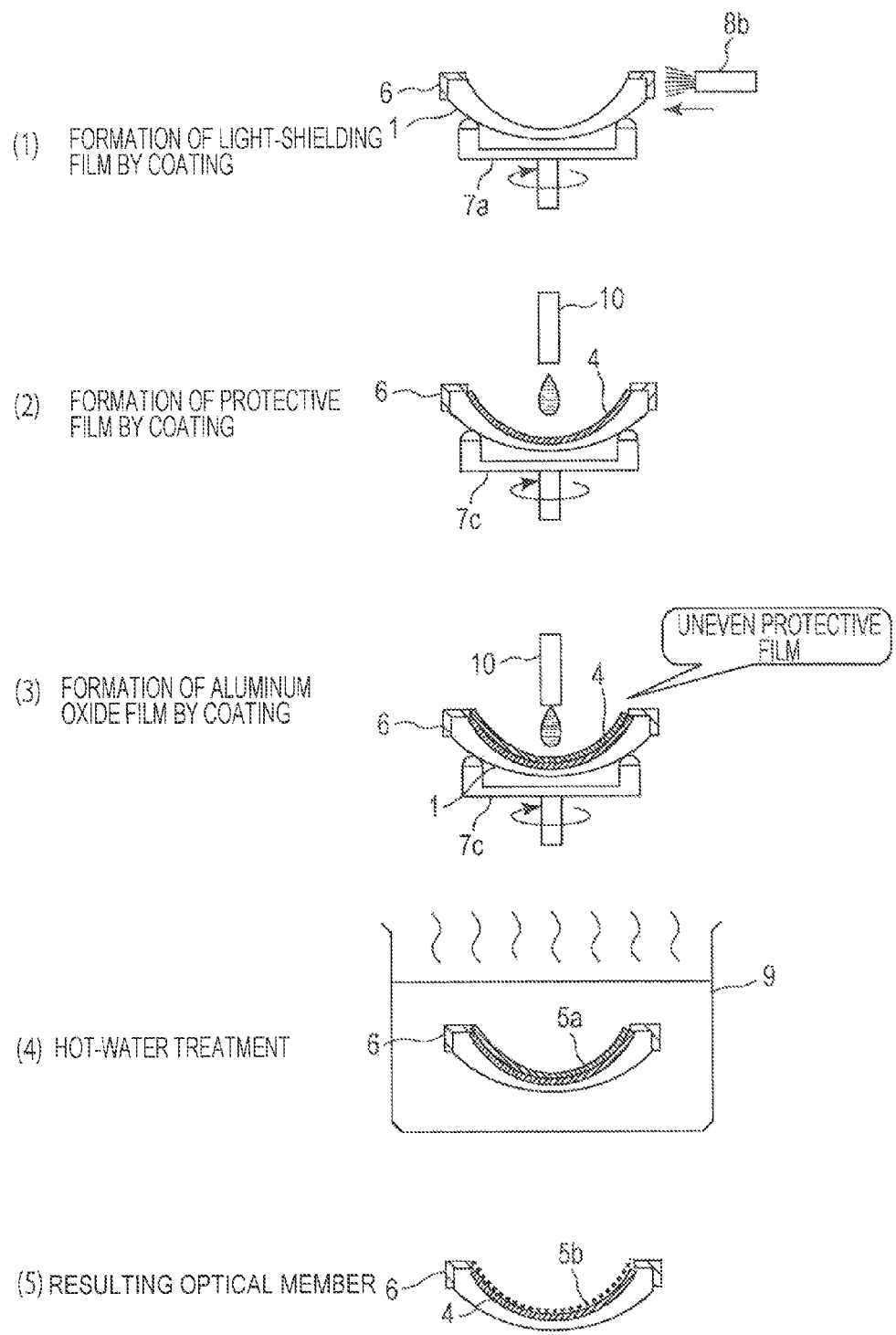
FIGS. 3C(1) to 3C(5) are process drawings illustrating a method for producing an optical member according to the related art.

An optical member is formed by a method for producing an optical member illustrated in FIGS. 3C(1) to 3C(5).
(1) Formation of Light-Shielding Film by Coating The base 1 composed of a lanthanum-based glass is rinsed with deionized water, washed with an alcohol, and placed on a rotary stage 7a fitted with a vacuum chuck as illustrated in FIG. 3C(1). A resin containing a black dye, an additive, and a curing agent is applied with a brush 8b onto the ray ineffective area 3 (outer end portion of the base 1) with the base 1 rotated slowly, and is then dried to form a coating as a light-shielding film.

(2) Formation of Protective SiTi Film by Coating

Referring to FIG. 3C(2), an appropriate amount of a sol solution containing Si and Ti is dropped onto base 1. Spin coating is performed at about 3000 rpm for about 20 seconds. The resulting film is baked at 80° C. or higher for 10 minutes in an oven to form a continuous protective amorphous SiTi film having a thickness of 50 nm over the ray effective area 2b and part of the ray ineffective area 3.

(3) Formation of Aluminum Oxide Film by Coating

Referring to FIG. 3C(3), the base 1 on which the protective film is formed by coating is placed on a rotary stage 7c fitted with a vacuum chuck. An appropriate amount of the aluminum-containing sol solution is dropped onto the ray effective area 2b. The base 1 is rotated at about 3000 rpm for about 30 seconds and baked at 100° C. or higher for 30 minutes or more in an oven.

(4) Hot-Water Treatment

The base 1 is immersed in hot water having a temperature of 60° C. to 100° C. in the hot-water treatment container 9 illustrated in FIG. 3C(4) for 5 minutes to 24 hours. Then the base 1 is withdrawn and dried.

(5) Optical Member

FIGS. 3C(5) and 2C schematically illustrate the resulting optical member. The optical member according to COMPARATIVE EXAMPLE 1 has a structure in which the protective film 4 is arranged between the plate-crystal film 5b and the base 1 in the ray effective area 2b and in which the protective film 4 is not arranged between the light-shielding film 6 and the base 1 in the ray ineffective area 3.

Evaluation of Optical Member

Similarly to Example 1, the observation of the cross section of the protective SiTi film formed in COMPARATIVE EXAMPLE 1 in the vicinity of the ray ineffective area with the FE-SEM reveals that the protective film has thin and thick portions, i.e., the film does not have a uniform thickness. Thus, the ray effective area 2b of the optical member is reduced as illustrated in FIG. 2C.

This is presumably because when the protective film is formed in the step (2) in COMPARATIVE EXAMPLE 1, the presence of the light-shielding film in the peripheral portion inhibits the spreading of the coating solution in a centrifugal direction during the spin coating.

Environmental Evaluation

Visual inspection after an environmental test under high-temperature and high-humidity conditions (HH conditions: at 70° C. and a humidity of 90% for 1500 hours) reveals that a poorly spotted appearance is caused by the degradation of the light-shielding film in the ray ineffective area.

Leaching of Constituent

X-ray fluorescence analysis of the plate-crystal film in the ray effective area under the same high-temperature and high-humidity conditions reveals that a constituent element of glass is detected.

Example 2

In this example, a base composed of a barium-based glass is used, and a protective film is formed by a vacuum evaporation process in place of the formation of the protective SiTi film by coating illustrated in FIG. 3A(1) of EXAMPLE 1. That is, the spin coating step illustrated in FIG. 3A(1) is not performed.

(1) Formation of Protective Film by Evaporation

A vacuum apparatus (not shown) provided with an ion assist unit is used. A base is placed in a base holder in such a manner that the concave surface of the base faces an evaporation source. The base holder can be rotated. The rotation rate is set to 30 rpm. The temperature of the base is set to 150° C.

$SiO_2$ is deposited by electron beam evaporation with a $SiO_2$ powder serving as the evaporation source. The center of the base is irradiated with an oxygen plasma beam from the ion assist unit, thereby forming a continuous $SiO_2$ film over the ray effective area and part of the ray ineffective area of the base.

(2) Formation of Light-Shielding Film by Coating

As illustrated in FIG. 3A(2), the base is placed on the rotary stage 7a fitted with a vacuum chuck. Coating is performed on the ray ineffective area 3 (outer end portion of the base 1) with the base 1 rotated slowly. A resin containing a black dye, an additive, and a curing agent is applied with a brush 8a and dried.

(3) Formation of Aluminum Oxide Film by Coating

The base 1 on which the light-shielding film is formed by coating is placed on the rotary stage 7c fitted with a vacuum chuck. An appropriate amount of an aluminum-containing coating solution is dropped onto the ray effective area 2b. The base 1 is rotated at about 3000 rpm for about 30 seconds and baked at 100° C. or higher for 30 minutes or more in an oven.

Here, with respect to spin-coating conditions, the spin rate is set to about 3000 rpm, and the spin time is set to about 30 seconds. However, the conditions are not limited thereto. To achieve a target thickness, coating conditions may be changed. Furthermore, the coating method is not limited to spin coating. For example, dipping or spray coating may be employed.

(4) Hot-Water Treatment

The base 1 is immersed in a hot-water treatment container 9 illustrated in FIG. 3A(4) to form the plate-crystal film 5b in the ray effective area 2b. The base 1 is immersed in hot water having a temperature of 60° C. to 100° C. in the hot-water treatment container 9 for 5 minutes to 24 hours. Then the base 1 is withdrawn and dried.

(5) Optical Member

As illustrated in FIG. 3A(5), the completed optical member includes the plate-crystal film 5b on the protective film 4 located in the ray effective area 2b, the plate-crystal film 5b being composed of petaloid transparent alumina.

One of the resulting optical members is sampled. A surface of the ray effective area is observed from above and in cross section with a FE-SEM. The observation results demonstrate that a petaloid plate-crystal film composed alumina is formed and has an average pitch of 400 nm or less, an average height of 50 nm or more, and excellent reflectance characteristics.

Evaluation of Optical Member

Similarly, the observation of the cross section of the protective film 4 in the vicinity of the ray ineffective area 3 demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that the optical member does not have a poorly spotted appearance caused by the delamination of the light-shielding film in the ray ineffective area.

Leaching of Constituent

X-ray fluorescence analysis of the plate-crystal film in the ray effective area under the same high-temperature and high-humidity conditions reveals that a constituent element of glass is not detected.

Comparative Example 2

An optical member according to COMPARATIVE EXAMPLE 2 is formed by a method for producing an optical member illustrated in FIGS. 3C(1) to 3C(5).

(1) Formation of Light-Shielding Film by Coating

The base 1 composed of a barium-based glass is rinsed with deionized water, washed with an alcohol, and placed on a rotary stage 7a fitted with a vacuum chuck as illustrated in FIG. 3C(1). A resin containing a black dye, an additive, and a curing agent is applied with a brush 8b onto the ray ineffective area 3 (outer end portion of the base 1) with the base 1 rotated slowly, and is then dried to form a coating as a light-shielding film at an operating wavelength.

(2) Formation of Protective Film by Evaporation

Similarly to the step of forming the protective film by evaporation in EXAMPLE 2, a $SiO_2$ film serving as the protective film 4 is formed by evaporation in place of the step of forming the protective film by coating illustrated in FIG. 3C(2). The $SiO_2$ film serving as the protective film 4 is formed by evaporation in the ray ineffective area 3 of the base 1a and on a surface of the light-shielding film 6 in the ray effective area 2b.

As illustrated in FIG. 2C, nonuniformity in the thickness of the protective film 4 in a portion of the ray effective area 2b near the light-shielding film 6 is caused by the steric hindrance of the light-shielding film 6.

(3) Formation of Aluminum Oxide Film by Coating

As illustrated in FIG. 3C(3), an appropriate amount of an aluminum-containing coating solution is dropped onto the ray effective area 2b. The base 1 is rotated at about 3000 rpm for about 30 seconds and baked at 100° C. or higher for 30 minutes or more in an oven.

(4) Hot-Water Treatment

The base 1 is immersed in hot water having a temperature of 60° C. to 100° C. in the hot-water treatment container 9 illustrated in FIG. 3C(4) for 5 minutes to 24 hours. Then the base 1 is withdrawn and dried.

(5) Optical Member

FIGS. 3C(5) and 2C schematically illustrate the resulting optical member. The optical member has a structure in which the protective film 4 is not arranged between the light-shielding film 6 and the base 1 in the ray ineffective area 3 and in which the protective film 4 is arranged between the plate-crystal film 5b and the base 1 in the ray effective area 2b.

Evaluation of Optical Member

The observation of the protective $SiO_2$ film in the vicinity of the ray ineffective area 3 of the optical member illustrated in FIGS. 3C(5) and 2C with the FE-SEM reveals that the protective film has thin and thick portions, i.e., the film has large nonuniformity in thickness. Thus, the ray effective area of the optical member is reduced. This is because when the protective film is formed in the step (2) in COMPARATIVE EXAMPLE 2, the steric hindrance of the light-shielding film located around the ray effective area affects the uniform deposition of $SiO_2$ by evaporation.

Environmental Evaluation

Visual inspection after an environmental test under high-temperature and high-humidity conditions (HH conditions: at 70° C. and a humidity of 90% for 1500 hours) reveals that a poorly spotted appearance is caused by the delamination of the light-shielding film in the ray ineffective area. This is presumably because the protective film is not arranged in the ray ineffective area, thereby resulting in a reduction in the adhesion of the light-shielding film 6.

Leaching of Constituent

X-ray fluorescence analysis of the plate-crystal film in the ray effective area under the same high-temperature and high-humidity conditions reveals that a constituent element of glass is detected. This is presumably because the protective film 4 is not arranged in the ray ineffective area, so that the constituent element is diffused from the base 1 to the plate-crystal film 5b through the light-shielding film 6.

Example 3

An example in which the protective film 4 is composed of a polyimide will be described below.

In this example, a protective film composed of a polyimide, which is an organic material, is formed in place of the formation of the protective SiTi film by coating in the step (1) in EXAMPLE 1. In the formation of the protective film by coating illustrated in FIG. 3A(1), the following step is used.

An appropriate amount of a polyimide solution containing polyimide and cyclohexanone in a ratio of 2:98 (by weight), the polyimide being represented by chemical formula (1) described below, is dropped onto the base 1 composed of a barium-based glass. Spin coating is performed at 500 rpm for 5 seconds and then at 3000 rpm for about 20 seconds.

[Chem. 1]

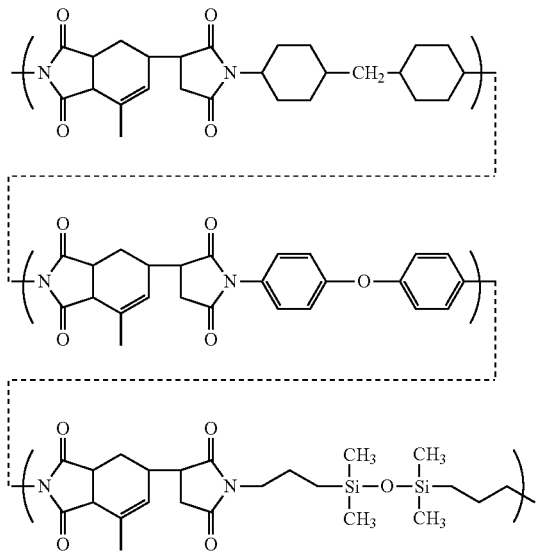

The base 1 is baked at 200° C. for 30 minutes in an oven. The thickness and the refractive index of the resulting polyimide film are measured by ellipsometry. The thickness is found to be 52 nm. The refractive index is found to be 1.57 at a wavelength of 550 nm.

The other steps are the same as those in EXAMPLE 1.

Evaluation of Optical Member

Similarly to EXAMPLE 1, the observation of the cross section of the protective film 4 in the vicinity of the ray ineffective area with the FE-SEM demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.

Leaching of Constituent

X-ray fluorescence analysis of the plate-crystal film in the ray effective area under the same high-temperature and high-humidity conditions reveals that a constituent element of glass is not detected.

Comparative Example 3

A polyimide film serving as a protective film is formed by coating as in EXAMPLE 3 in place of the formation of the protective SiTi film by coating in the step (2) in COMPARATIVE EXAMPLE 1. The other steps are the same as those in COMPARATIVE EXAMPLE 1.

Evaluation of Optical Member

The observation of the protective polyimide film in the vicinity of the ray ineffective area of the base 1 of the optical member illustrated in FIG. 3C(5) with the FE-SEM reveals that the protective film has thin and thick portions, i.e., the film has large nonuniformity in thickness. Thus, the ray effective area of the optical member is reduced.

This is because when the protective film is formed in the step (2) in COMPARATIVE EXAMPLE 3, the light-shielding film located around the ray effective area affects the uniform formation of the polyimide film by spin coating.

Environmental Evaluation

Visual inspection after an environmental test under high-temperature and high-humidity conditions (HH conditions: at 70° C. and a humidity of 90% for 1500 hours) reveals that a poorly spotted appearance is caused by the delamination of the light-shielding film in the ray ineffective area.

Leaching of Constituent

X-ray fluorescence analysis of the plate-crystal film in the ray effective area under the same high-temperature and high-humidity conditions reveals that a constituent element of glass is detected.

Example 4

In this example, a protective film composed of a silsesquioxane is formed in place of the formation of the protective SiTi film by coating in the step (1) in EXAMPLE 1. In the formation of the protective film by coating illustrated in FIG. 3A(1), the following step is used.

An appropriate amount of an organosilsesquioxane polymer solution containing a phenyl/methyl silsesquioxane polymer (trade name: Glass Resin GR-150F, manufactured by Techneglass Inc.), ethyl silicate, and 1-methoxy-2-propanol in a ratio of 4.9:0.1:95 (by weight), the phenyl/methyl silsesquioxane polymer being represented by chemical formula (2) described below, is dropped onto the base 1 composed of a barium-based glass. Spin coating is performed at 500 rpm for 5 seconds and then at 3000 rpm for about 20 seconds.

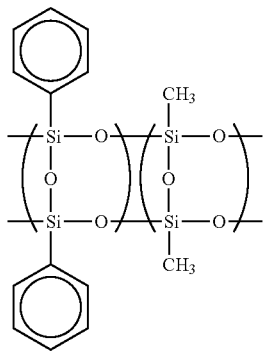

[Chem. 2]

The base 1 is baked at 200° C. for 30 minutes in an oven. The thickness and the refractive index of the phenyl/methyl silsesquioxane polymer are measured by ellipsometry. The thickness is found to be 56 nm. The refractive index is found to be 1.52 at a wavelength of 550 nm.

The other steps are the same as those in EXAMPLE 1.

Evaluation of Optical Member

The observation of the cross section of the protective film 4 in the vicinity of the ray ineffective area with the FE-SEM demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.

Leaching of Constituent

X-ray fluorescence analysis of the plate-crystal film in the ray effective area under the same high-temperature and high-humidity conditions reveals that a constituent element of glass is not detected.

Comparative Example 4

A silsesquioxane is applied as in EXAMPLE 4 in place of the formation of the protective SiTi film by coating in the step (2) in COMPARATIVE EXAMPLE 1. The other steps are the same as those in COMPARATIVE EXAMPLE 1.

Evaluation of Optical Member

The observation of a protective silsesquioxane film in the vicinity of the ray ineffective area of the base 1 of the optical member illustrated in FIG. 3C(5) with the FE-SEM reveals that the protective film has thin and thick portions, i.e., the film has large nonuniformity in thickness. Thus, the ray effective area of the optical member is reduced.

This is because when the protective film is formed in the step (2) in COMPARATIVE EXAMPLE 4, the light-shielding film located around the ray effective area affects the uniform formation of the silsesquioxane film by spin coating.

Environmental Evaluation

Visual inspection after an environmental test under high-temperature and high-humidity conditions (HH conditions: at 70° C. and a humidity of 90% for 1500 hours) reveals that a poorly spotted appearance is caused by the degradation of the light-shielding film in the ray ineffective area.

Leaching of Constituent

X-ray fluorescence analysis of the plate-crystal film in the ray effective area under the same high-temperature and high-humidity conditions reveals that a constituent element of glass is detected.

Example 5

In this example, a silane coupling agent is used for a protective film in place of the formation of the protective SiTi film by coating in the step (1) in EXAMPLE 1. In the formation of the protective film by coating illustrated in FIG. 3A(1), the following step is used.

An appropriate amount of a silane coupling agent solution containing 3-glycidoxypropyltrimethoxysilane, 1-methoxy-2-propanol, and deionized water in a ratio of 1:99:0.01 (by weight), 3-glycidoxypropyltrimethoxysilane being represented by chemical formula (3) described below, is dropped onto the base 1 composed of a barium-based glass. Spin coating is performed at 500 rpm for 5 seconds and then at 3000 rpm for about 20 seconds.

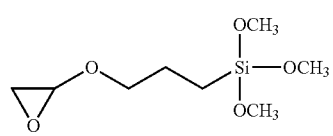

[Chem. 3]

The base 1 is baked at 80° C. for 30 minutes in an oven. In this case, the film made from the silane coupling agent has a thickness of 5 nm. The other steps are the same as those in EXAMPLE 1.

Evaluation of Optical Member

Similarly to EXAMPLE 1, the observation of the cross section of the protective film 4 in the vicinity of the ray ineffective area with the FE-SEM demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.

Leaching of Constituent

X-ray fluorescence analysis of the plate-crystal film in the ray effective area under the same high-temperature and high-humidity conditions reveals that a constituent element of glass is not detected.

Comparative Example 5

A silane coupling agent is used to form the protective film by coating as in EXAMPLE 5 in place of the formation of the protective SiTi film by coating in the step (2) in COMPARATIVE EXAMPLE 1. The other steps are the same as those in COMPARATIVE EXAMPLE 1.

Evaluation of Optical Member

The observation of a protective film (made from the silane coupling agent) in the vicinity of the ray ineffective area of the base 1 of the optical member illustrated in FIG. 3C(5) with the FE-SEM reveals that the protective film has thin and thick portions, i.e., the film has large nonuniformity in thickness. Thus, the ray effective area of the optical member is reduced.

This is because when the protective film is formed in the step (2) in COMPARATIVE EXAMPLE 5, the light-shielding film located around the ray effective area affects the uniform formation of the protective film made from the silane coupling agent by coating.
Environmental Evaluation Visual inspection after an environmental test under high-temperature and high-humidity conditions (HH conditions: at 70° C. and a humidity of 90% for 1500 hours) reveals that a poorly spotted appearance is caused by the degradation of the light-shielding film in the ray ineffective area.
Leaching of Constituent X-ray fluorescence analysis of the plate-crystal film in the ray effective area under the same high-temperature and high-humidity conditions reveals that a constituent element of glass is detected.

Example 6

In this example, an optical member has a structure in which an aluminum-containing film is provided between the protective film and a light-shielding film in the ray ineffective area in addition to the laminated structure including the protective SiTi film in EXAMPLE 1.

Figure 2B:
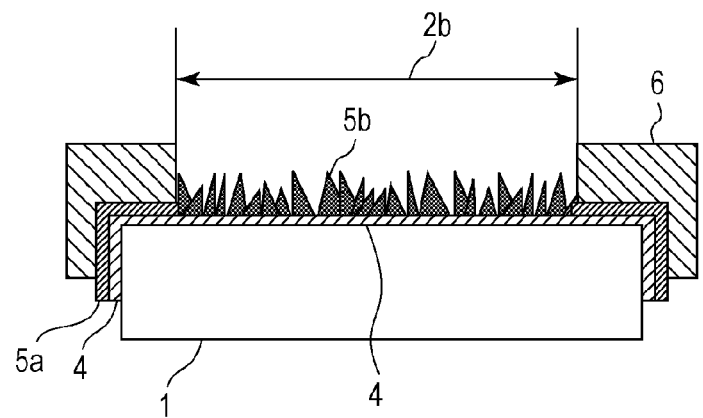
FIG. 2B is a schematic view of a ray effective area of an optical member according to another embodiment of the present invention.
Figure 2C:
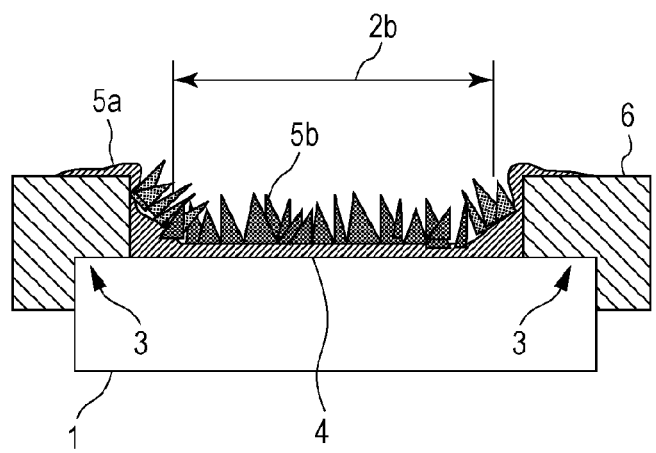
FIG. 2C is a schematic view of a ray effective area of an optical member according to the related art.

FIGS. 1B and 2B illustrate an optical member according to this example. A method for producing the optical member is a method for producing an optical member illustrated in FIGS. 3B(1) to 3B(5).

This example will be described below with reference to the production steps illustrated in FIGS. 3B(1) to 3B(5).
(1) Formation of Protective SiTi Film by Coating The base 1 composed of a lanthanum-based glass is rinsed with deionized water, washed with an alcohol, and placed on the rotary stage 7a fitted with a vacuum chuck as illustrated in FIG. 3B(1). An appropriate amount of a sol solution containing Si and Ti is dropped onto the base 1 with the base 1 rotated slowly. Spin coating is performed at about 3000 rpm for about 20 seconds. The resulting film is baked at 80° C. or higher for 10 minutes in an oven.

In this way, a continuous protective amorphous SiTi film having a thickness of 50 nm is formed over the ray effective area and part of the ray ineffective area.
(2) Formation of Aluminum Oxide Film by Coating The base 1 on which the protective film is formed is placed on the rotary stage 7c fitted with a vacuum chuck. An appropriate amount of a coating solution containing aluminum oxide is dropped onto the ray effective area 2b and the ray ineffective area 3. The base 1 is rotated at about 3000 rpm for about 30 seconds and baked at 100° C. or higher for 30 minutes or more in an oven, thereby forming the film 5a mainly containing aluminum oxide.
(3) Formation of Light-Shielding Film by Coating A resin containing a black dye, an additive, and a curing agent is applied with the brush 8a onto the ray ineffective area 3 (outer end portion of the base 1) and dried to form a coating as the light-shielding film 6.
(4) Hot-Water Treatment The base 1 is immersed in a hot-water treatment container 9 illustrated in FIG. 3B(4) to form the plate-crystal film 5b in the ray effective area 2b. The base 1 is immersed in hot water having a temperature of 60° C. to 100° C. in the hot-water treatment container 9 for 5 minutes to 24 hours. Then the base 1 is withdrawn and dried.
(5) Optical Member As illustrated in FIGS. 3B(5) and 2B, the resulting optical member includes the plate-crystal film 5b on the protective film located in the ray effective area, the plate-crystal film 5b being composed of petaloid transparent alumina. In the ray ineffective area, the aluminum-containing film 5a is arranged between the protective film 4 and the light-shielding film 6.

A surface of the ray effective area of the resulting optical member is observed from above and in cross section with a FE-SEM. The observation results demonstrate the formation of a petaloid plate-crystal film having an average pitch of 400 nm or less and an average height of 50 nm or more.
Evaluation of Optical Member The observation of the cross section of the protective SiTi film in the vicinity of the ray ineffective area with the SEM demonstrates the uniform thickness of the protective film and demonstrates the extension of the ray effective area as illustrated in FIG. 2B.
Environmental Evaluation Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.
Leaching of Constituent X-ray fluorescence analysis of the plate-crystal film in the ray effective area under the same high-temperature and high-humidity conditions reveals that a constituent element of glass is not detected.

Example 7

In EXAMPLE 7, an optical member illustrated in FIG. 1A is produced by the method for producing an optical member illustrated in FIGS. 3A(1) to 3A(5) according to EXAMPLE 1. In this example, an aluminum film is formed in place of the formation of the aluminum oxide film by coating in the step (3) of EXAMPLE 1.

Steps similar to the steps described in Sections "(1) Formation of Protective SiTi Film by Coating" and "(2) Formation of Light-Shielding Film by Coating" in EXAMPLE 1 are performed. Then a step (3) of forming an aluminum film by evaporation and a step (4) of performing hot-water treatment are conducted. The evaluation of the resulting optical member is performed as in EXAMPLE 1.

The step (3) of forming an aluminum film in this example will be described below.

The base 1 is placed in a base holder in a vacuum apparatus in such a manner that the concave surface of the base 1 faces an evaporation source. The base holder can be rotated. The rotation rate is set to 30 rpm. The temperature of the base is set to room temperature.

Aluminum pellets are used as the evaporation source. The aluminum pellets are melted with an electron beam in advance. An aluminum film is formed by electron beam evaporation on the base 1 while the power of an electron gun is appropriately adjusted.

After the aluminum film having a target thickness is formed, the pressure in the vacuum apparatus is returned to atmospheric pressure. Then the base 1 is taken out.

As with EXAMPLE 1, the following step and evaluations are performed.
(4) Hot-Water Treatment The base 1 is immersed in a hot-water treatment container 9 illustrated in FIG. 3A(4) to form the plate-crystal film 5b in the ray effective area 2b. The base 1 is immersed in hot water having a temperature of 60° C. to 100° C. in the hot-water treatment container 9 for 5 minutes to 24 hours. Then the base 1 is withdrawn and dried.

(5) Optical Member

Thereby, an optical member illustrated in FIG. 3A(5) is produced. As illustrated in FIG. 2A, the resulting optical member includes the plate-crystal film 5b on the protective film 4 located in the ray effective area 2b, the plate-crystal film 5b being composed of petaloid transparent alumina.

One of the resulting optical members is sampled. A surface of the ray effective area is observed from above and in cross section with a field-emission scanning electron microscope (FE-SEM). The observation results demonstrate the formation of a petaloid plate-crystal film having an average pitch of 400 nm or less and an average height of 50 nm or more.

Evaluation of Optical Member

Similarly, the observation of the cross section of the protective SiTi film in the vicinity of the ray ineffective area with the FE-SEM demonstrates the uniform thickness of the protective film 4 and demonstrates the extension of the ray effective area 2b as illustrated in FIG. 2A.

Environmental Evaluation

Visual inspection after an environmental test under high-temperature and high-humidity conditions (HH conditions: at 70° C. and a humidity of 90% for 1500 hours) reveals that a spot caused by the degradation of the light-shielding film in the ray ineffective area is not formed.

Leaching of Constituent

X-ray fluorescence analysis of the plate-crystal film in the ray effective area under the same high-temperature and high-humidity conditions reveals that a constituent element of glass is not detected.

Comparative Example 6

An optical member according to COMPARATIVE EXAMPLE 6 is formed as in COMPARATIVE EXAMPLE 1 by the method for producing an optical member illustrated in FIGS. 3C(1) to 3C(5).

In this comparative example, an aluminum film is formed in place of the formation of the aluminum oxide film by coating in the step (3) of COMPARATIVE EXAMPLE 1.

Steps similar to the steps described in Sections "(1) Formation of Light-Shielding Film by Coating" and "Formation of Protective SiTi Film by Coating" in COMPARATIVE EXAMPLE 1 are performed. Then a step (3) of forming an aluminum film and a step (4) of performing hot-water treatment are conducted. The evaluation of the resulting optical member is performed as in COMPARATIVE EXAMPLE 1.

(1) Formation of Light-Shielding Film by Coating

The base 1 composed of a lanthanum-based glass is rinsed with deionized water, washed with an alcohol, and placed on a rotary stage 7a fitted with a vacuum chuck as illustrated in FIG. 3C(1). A resin containing a black dye, an additive, and a curing agent is applied with a brush 8b onto the ray ineffective area 3 (outer end portion of the base 1) with the base 1 rotated slowly, and is then dried to form a coating as a light-shielding film.

(2) Formation of Protective SiTi Film by Coating

Referring to FIG. 3C(2), an appropriate amount of a sol solution containing Si and Ti is dropped onto base 1. Spin coating is performed at about 3000 rpm for about 20 seconds. The resulting film is baked at 80° C. or higher for 10 minutes in an oven to form a continuous protective amorphous SiTi film having a thickness of 50 nm over the ray effective area 2b and part of the ray ineffective area 3.

(3) Formation of Aluminum Film

The base 1 is placed in a base holder in a vacuum apparatus in such a manner that the concave surface of the base 1 faces an evaporation source. The base holder can be rotated. The rotation rate is set to 30 rpm. The temperature of the base is set to room temperature.

Aluminum pellets are used as the evaporation source. The aluminum pellets are melted with an electron beam in advance. An aluminum film is formed by electron beam evaporation on the base 1 while the power of an electron gun is appropriately adjusted.

After the aluminum film having a target thickness is formed, the pressure in the vacuum apparatus is returned to atmospheric pressure. Then the base 1 is taken out.

(4) Hot-Water Treatment

The base 1 is immersed in hot water having a temperature of 60° C. to 100° C. in the hot-water treatment container 9 illustrated in FIG. 3C(4) for 5 minutes to 24 hours. Then the base 1 is withdrawn and dried.

(5) Optical Member

FIGS. 3C(5) and 2C schematically illustrate the resulting optical member. The optical member according to COMPARATIVE EXAMPLE 1 has a structure in which the protective film 4 is arranged between the plate-crystal film 5b and the base 1 in the ray effective area 2b and in which the protective film 4 is not arranged between the light-shielding film 6 and the base 1 in the ray ineffective area 3.

Evaluation of Optical Member

Similarly to Example 7, the observation of the cross section of the protective SiTi film formed in COMPARATIVE EXAMPLE 6 in the vicinity of the ray ineffective area with the FE-SEM reveals that the protective film has thin and thick portions, i.e., the film does not have a uniform thickness. Thus, the ray effective area 2b of the optical member is reduced as illustrated in FIG. 2C.

This is presumably because when the protective film is formed in the step (2) in COMPARATIVE EXAMPLE 6, the presence of the light-shielding film in the peripheral portion inhibits the spreading of the coating solution in a centrifugal direction during the spin coating.

Environmental Evaluation

Visual inspection after an environmental test under high-temperature and high-humidity conditions (HH conditions: at 70° C. and a humidity of 90% for 1500 hours) reveals that a poorly spotted appearance is caused by the degradation of the light-shielding film in the ray ineffective area.

Leaching of Constituent

X-ray fluorescence analysis of the plate-crystal film in the ray effective area under the same high-temperature and high-humidity conditions reveals that a constituent element of glass is detected.

Aspects of the present invention provide a high-performance, high-quality optical member having a high ability to prevent inner-surface reflection.

Table 1 summarizes the evaluation results of the optical members produced in EXAMPLES and COMPARATIVE EXAMPLES.

TABLE 1

| | Material of protective film | Process drawings | Ray effective area | Visual inspection (HH durability) | Analysis of leaching of constituent |
|---|---|---|---|---|---|
| EXAMPLE 1 | SiTi | FIG. 3A | A | A | A |
| COMPARATIVE EXAMPLE 1 | SiTi | FIG. 3C | B | B | B |
| EXAMPLE 2 | SiO$_2$ | FIG. 3A | A | A | A |
| COMPARATIVE EXAMPLE 2 | SiO$_2$ | FIG. 3C | B | B | B |
| EXAMPLE 3 | PI | FIG. 3A | A | A | A |
| COMPARATIVE EXAMPLE 3 | PI | FIG. 3C | B | B | B |
| EXAMPLE 4 | silsesquioxane | FIG. 3A | A | A | A |
| COMPARATIVE EXAMPLE 4 | silsesquioxane | FIG. 3C | B | B | B |
| EXAMPLE 5 | silane coupling agent | FIG. 3A | A | A | A |
| COMPARATIVE EXAMPLE 5 | silane coupling agent | FIG. 3C | B | B | B |
| EXAMPLE 6 | SiTi | FIG. 3B | A | A | A |
| EXAMPLE 7 | SiTi | FIG. 3A | A | A | A |
| COMPARATIVE EXAMPLE 6 | SiTi | FIG. 3C | B | B | B |

(note 1) Ray effective area
A: The effective area is large.
B: The effective area is small.
(note 2) Visual inspection (HH durability)
A: Poor appearance is not obtained (visual observation)
B: Poor appearance is obtained (visual observation)
(note 3) Analysis of leaching of constituent
A: A constituent element of glass is detected.
B: No constituent element of glass is detected.

The optical member according to aspects of the present invention stably provides antireflective performance over a prolonged period of time and can be used for an optical system, such as a lens, that requires an antireflection function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193214 filed Aug. 31, 2010, which is hereby incorporated by reference herein in its entirety.

What is claimed is:

1. A method for producing an optical member including a ray effective area and a ray ineffective area, the method comprising the steps of:
    forming at least one continuous protective film over the ray effective area and at least part of the ray ineffective area;
    forming a light-shielding film on the protective film located in the ray ineffective area;
    after forming the light-shielding film, forming an aluminum-containing film on the protective film located in the ray effective area; and
    bringing the aluminum-containing film into contact with hot water to form a plate-crystal film on the protective film located in the ray effective area, the plate-crystal film having a textured structure on a surface thereof and comprising mainly aluminum oxide.

2. The method for producing an optical member according to claim 1, wherein the protective film contains at least Si.

3. An optical system comprising: the optical member according to claim 2.

4. The method for producing an optical member according to claim 1, wherein the protective film contains an organic component.

5. An optical system comprising: the optical member according to claim 4.

6. The method for producing an optical member according to claim 1, wherein the plate-crystal film has a textured structure comprising mainly aluminum oxide crystals, aluminum hydroxide crystals, or hydrated aluminum oxide crystals.

7. An optical member produced by the method according to claim 1.

8. A method for producing an optical member including a ray effective area and a ray ineffective area, the method comprising the steps of:
    forming at least one continuous protective film over the ray effective area and at least part of the ray ineffective area;
    forming an aluminum-containing film on the protective film;
    forming a light-shielding film on the aluminum-containing film located in the ray ineffective area; and
    bringing the aluminum-containing film located in the ray effective area into contact with hot water to form a plate-crystal film on the protective film located in the ray effective area, the plate-crystal film having a textured structure on a surface thereof and comprising mainly aluminum oxide.

9. The method for producing an optical member according to claim 8, wherein the protective film contains at least Si.

10. The method for producing an optical member according to claim 8, wherein the protective film contains an organic component.

11. The method for producing an optical member according to claim 8, wherein the plate-crystal film has a textured structure comprising mainly aluminum oxide crystals, aluminum hydroxide crystals, or hydrated aluminum oxide crystals.

12. An optical member produced by the method according to claim 8.

* * * * *